United States Patent Office 3,467,644
Patented Sept. 16, 1969

3,467,644
MONOAZO DYESTUFFS
Gerhard Wolfrum, Opladen, and Hermann Wunderlich,
Cologne-Mulheim, Germany, assignors to Farbenfabriken Bayer Aktiengesellschaft, Leverkusen, Germany,
a corporation of Germany
No Drawing. Filed July 12, 1966, Ser. No. 564,532
Claims priority, application Germany, July 28, 1965
F 46,729
Int. Cl. C09b 29/36, 29/00
U.S. Cl. 260—158    6 Claims

ABSTRACT OF THE DISCLOSURE

Monoazo dyestuffs useful in dyeing metal-containing synthetic fibers such as polypropylene corresponding to the general formula

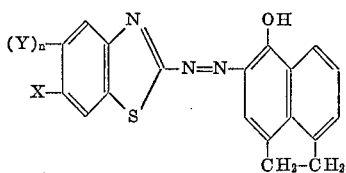

wherein X is lower alkoxy, halogen, alkyl, carboxy lower alkyl, mercapto lower alkyl, trifluoromethyl, or hydroxy ethyl; Y is lower alkoxy, halogen, or alkyl; and $n$ is an integer from 0 to 1.

---

The present invention relates to monoazo dyestuffs which are insoluble or hardly soluble in water and correspond to the following general formula:

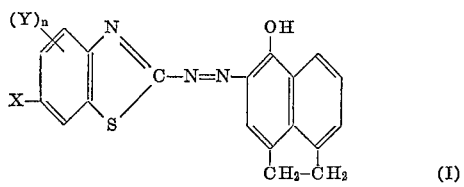

In this formula X is a substituent $-OCH_3$, $-OC_2H_5$, $-OC_3H_7$, $-OC_4H_9$, Cl, Br, $-CH_3$, $-C_2H_5-$, $-CF_3$, $-COOCH_3$, $-COOC_2H_5$, $-COOC_3H_7$, $-COOC_4H_9$, $-SCH_3$, $-SC_2H_5$, $-CH_2CH_2OH$, Y a substituent $-OCH_3$, $-OC_2H_5$, $-OC_3H_7$, $-Cl$, $-Br$, $-CH_3$, $-C_2H_5$ and $n$ is the number 0 or 1.

The new azo dyestuffs are produced by coupling a diazotised aminobenzothiazole compound of the formula

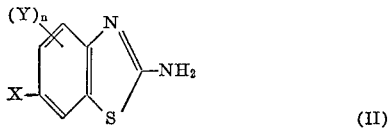

in which X, Y and $n$ have the same meaning as above, with 5-hydroxy-acenaphthene. The coupling is carried out in an aqueous, organic or organic/aqueous medium at acidic, neutral or alkaline pH values. The resulting monoazo dyestuffs, which are hardly soluble to insoluble in water, are isolated by filtration or, in the case of coupling in an organic solvent, first precipitated by the addition of water and then isolated also by filtration.

Suitable diazo components (II) are for example the following:

2-amino-6-chlorobenzothiazole-(1,3),
2-amino-6-bromobenzothriazole-(1,3),
2-amino-6-trifluoromethylbenzothiazole-(1,3),
2-amino-6-methylbenzothiazole-(1,3),
2-amino-6-ethylbenzothiazole-(1,3),
2-amino-6-(β-hydroxyethyl)-benzothiazole-(1,3),
2-amino-5-methoxy-6-ethoxybenzothiazole-(1,3),
2-amino-6-methoxybenzothiazole-(1,3),
2-amino-6-ethoxybenzothiazole-(1,3),
2-amino-6-propoxybenzothiazole-(1,3),
2-amino-6-butoxybenzothiazole-(1,3),
2-amino-6-methylthiobenzothiazole-(2,3),
2-amino-6-ethylthiobenzothiazole-(1,3),
2-aminobenzothiazole-(1,3)-carboxylic acid methyl ester-(6),
2-aminobenzothiazole-(1,3)-carboxylic acid ethyl ester-(6),
2-aminobenzothiazole-(1,3)-carboxylic acid propyl ester-(6),
2-aminobenzothiazole-(1,3)-carboxylic acid butyl ester-(6),
2-amino-4-chloro-6-ethoxybenzothiazole-(1,3).

The coupling component 5-hydroxy-acenaphthene to be used according to this process can easily be obtained, for example, by methods known from the literature (see German patent specification No. 517,264; Journal of the American Chemical Society, vol. 73, pages 2718–2722 [1951]).

The dyestuffs (I) obtainable by the present process are eminently suitable for the dyeing and printing of synthetic fibres, especially of metal-containing polypropylene fibres or fabrics produced therefrom. The term metal-containing polypropylene fibres, includes particularly nickel-containing polypropylene fibres which contain the nickel, e.g. in the form of nickel chelate complexes. The materials of polypropylene may, however, also contain other metals in the place of nickel or in addition to nickel, especially aluminium and zinc.

Since the dyestuffs are insoluble or hardly soluble in water, dyeing is expediently carried out in the presence of compounds of a dispersing action. Swelling agents may be added to the dyebath in the customary manner to accelerate the dyeing; dyeing may also be carried out at higher temperatures in closed apparatus.

In the following examples, which are given for the purpose of illustrating the invention, the parts are parts by weight; the temperatures are given in degree centigrade.

EXAMPLE 1

19.4 parts 2-amino-6-ethoxybenzothiazole-(1,3) are dissolved, while stirring, in 100 parts 85% orthophosphoric acid and the solution is mixed portionwise at 0–5° with a solution of 6.9 parts sodium nitrite in 30 parts concentrated sulphuric acid. After stirring for 3–4 hours, this mixture is poured on to 100 parts ice, care being taken that the temperature does not exceed 5°. An excess of nitrous acid which may be present, is removed by means of amidosulphonic acid and the clear solution of the diazonium salt is finally mixed with a solution of 17.2 parts 5-hydroxy-acenaphthene in 200 ml. glacial acetic acid. When the coupling is completed, the resulting dyestuff of the formula

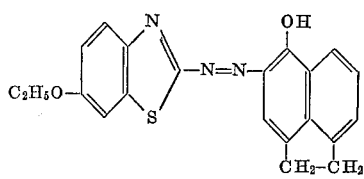

is filtered off, washed with water and dried. 36.2 parts of a dark brown-red powder are obtained.

0.2 part of this dyestuff and 0.2 part of a naphthalenesulphonic acid/formaldehyde condensation product are dispersed in 400 parts water and adjusted to pH 5–6 with acetic acid. 10 parts of a nickel-containing yarn of polypropylene fibres are introduced into this dyebath and dyed for 1 hour at boiling temperature. After a weakly alkaline aftertreatment at 50° with the addition of 0.5 part of a commercial detergent per 1000 parts of the wash liquor, a clear blue dyeing with very good fastness to wet processing, rubbing solvents and light is obtained.

The nickel-containing polypropylene fibres contain the nickel in the form of nickel chelate complexes, for example nickel phenolates of bis-(alkylphenol) monosulphides. They also contain spun into them UV absorbents and stabilisers.

When the 2-amino-6-ethoxybenzothiazole-(1,3) of the present example is replaced by the diazo components of the following table and these are coupled with 5-hydroxy-acenaphthene, dyestuffs are obtained which also yield valuable dyeings on polypropylene materials containing simultaneously nickel, zinc and aluminium, or on those containing nickel:

Diazo components:
  2-amino-6-methoxybenzothiazole-(1,3)
  2-amino-6-propoxybenzothiazole-(1,3)
  2-amino-6-chlorobenzothiazole-(1,3)
  2-amino-6-bromobenzothiazole-(1,3)
  2-amino-6-trifluoromethylbenzothiazole-(1,3)
  2-amino-6-ethylthio-benzothiazole-(1,3)
  2-aminobenzothiazole-(1,3)-carboxylic acid ethyl ester-(6)
    Shade on nickel-containing polypropylene fibres or on those containing simultaneously nickel, zinc and aluminium—blue
  2-aminobenzothiazole-(1,3)-carboxylic acid propyl ester-(6)
  2-amino-6-(β-hydroxyethyl)-benzothiazole-(1,3)
  2-amino-5-methoxy-6-ethoxybenzothiazole-(1,3)
  2-amino-4-chloro-6-ethoxybenzothiazole-(1,3)

EXAMPLE 2

194 parts 2-amino-6-ethoxybenzothiazole-(1,3) are introduced, while stirring, into 1800 parts 85% orthophosphoric acid. 304 parts of 41.8% nitrosylsulphuric acid (corresponding to a solution of 69 parts sodium nitrite in 235 parts 100% sulphuric acid) are added dropwise at −3° to −8° to this suspension within 1 hour and stirring is continued for 1 hour at the same temperature. 5 parts urea are then added and the mixture is again stirred for 30 minutes at the same temperature. The solution of 174 parts 5-hydroxy-acenaphthene in 750 parts glacial acetic acid is then allowed to run in within 10 minutes and stirring continued for a further 2 hours at 0°. After this time, coupling is completed. The reaction mixture is then poured, while stirring, into about 5000–6000 parts water, the precipitated dyestuff filtered off, washed with water until free of acid and dried at 60°. 370 parts of a dark brown-red powder are obtained.

We claim:
1. A monoazo dyestuff of the formula

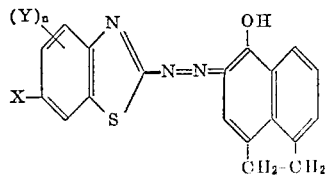

wherein X stands for —OCH₃, —OC₂H₅, —OC₃H₇, —OC₄H₉, Cl, Br, —CH₃, —C₂H₅, —CF₃, —COOCH₃, —COOC₂H₅, —COOC₃H₇, —COOC₄H₉, —SCH₃, —SC₂H₅ or —CH₂CH₂OH, Y stands for —OCH₃, —OC₂H₅, —OC₃H₇, —Cl, —Br, —CH₃ or —C₂H₅ and n stands for an integer from 0 to 1.

2. A dyestuff of claim 1 corresponding to the formula

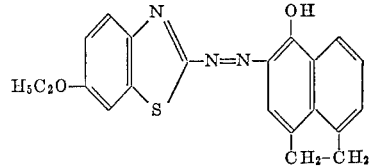

3. A dyestuff of claim 1 corresponding to the formula

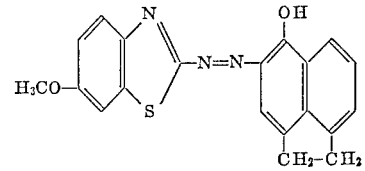

4. A dyestuff of claim 1 corresponding to the formula

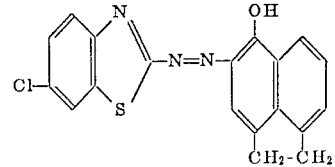

5. A dyestuff of claim 1 corresponding to the formula

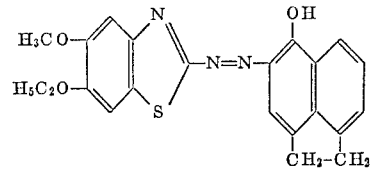

6. A dyestuff of claim 1 corresponding to the formula

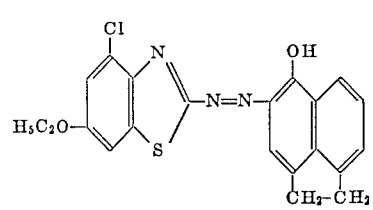

References Cited

UNITED STATES PATENTS

| | | | |
|---|---|---|---|
| 2,832,764 | 4/1958 | Huenig | 260—158 |
| 3,245,981 | 4/1966 | Stright | 260—158 |
| 3,318,865 | 5/1967 | Stright | 260—158 |
| 3,386,986 | 6/1968 | Brack | 260—158 XR |

FLOYD D. HIGEL, Primary Examiner

U.S. Cl. X.R.

8—4, 41; 117—138.8; 260—305, 619, 41